United States Patent Office.

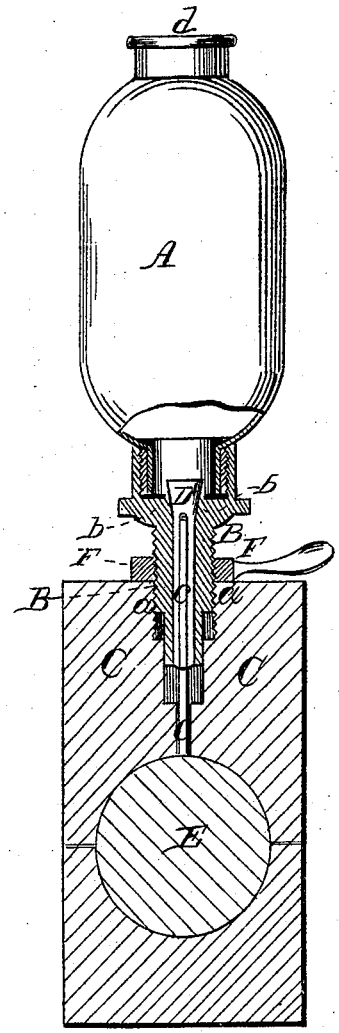

HENRY A. DANIELS, OF THOMASTON, CONNECTICUT.

Letters Patent No. 92,283, dated July 6, 1869.

IMPROVED LUBRICATOR.

The Schedule referred to in these Letters Patent and making part of the same.

*To all whom it may concern:*

Be it known that I, HENRY A. DANIELS, of Thomaston, in the county of Litchfield, and State of Connecticut, have invented a new and improved Lubricator; and I do hereby declare that the following is a full, clear, and exact description thereof, which will enable others skilled in the art to make and use the same, reference being had to the accompanying drawing, forming part of this specification.

The drawing represents a sectional side view of my improved lubricator.

This invention relates to that class of lubricators, for the journals of shafting, which are provided with shanks adapted to screw into the top of the journal-box, and which contain plungers or stems resting upon the journal of the shaft, and extending upward within the oil-cup; and The invention consists in forming a conical valve upon the upper end of the stem, and in making the screw-shank adjustable, so that when the latter is raised sufficiently above the journal-box, the valve will be seated in the upper end of the shank, and cut off the supply of oil from the cup, as will be hereinafter more fully described.

A, in the drawing, represents the oil-cup, made of glass or other suitable material, screwed or otherwise fastened to its tubular shank B, on which an external screw-thread $a$ is formed, as shown.

The shank can thus be screwed into the journal-box C, and can be turned higher or lower, at will.

D is the valve. It is adapted to close upon a seat, $b$, formed in the cup, and has its stem $c$, reaching through and beyond the shank, as shown.

The lower end of the stem $c$ is to rest on the shaft E when the valve is open, the cup being turned down far enough to carry the seat $b$ the requisite distance away from the valve.

When, however, the cup is screwed up, it will elevate the valve-seat, and raise the valve, so as to close the opening, and prevent the further escape of lubricating-matter.

The cup has a suitable cover, $d$, which, when opened, allows the filling of the cup.

F is a jam-nut, which is applied around the shank, above the journal, to lock the cup in any desired position.

Having thus described my invention,

What I claim as new, and desire to secure by Letters Patent, is—

The conical valve D, constructed as described, upon the upper end of the stem $c$, in combination with the adjustable shank B, carrying the oil-cup, whereby, when the shank B is sufficiently elevated above the journal-box, the valve is seated, and the supply of oil cut off, substantially as herein shown and described.

HENRY A. DANIELS.

Witnesses:
 FRANK BLOCKLEY,
 ALEX. F. ROBERTS.